United States Patent
Mizera et al.

(10) Patent No.: US 10,836,284 B1
(45) Date of Patent: Nov. 17, 2020

(54) HYGIENIC KIT FOR AIRPLANES

(71) Applicants: Sheila M. Mizera, Rocky Mountain House (CA); Kevin A. Stalker, Rocky Mountain House (CA)

(72) Inventors: Sheila M. Mizera, Rocky Mountain House (CA); Kevin A. Stalker, Rocky Mountain House (CA)

( * ) Notice: Subject to any disclaimer, the term of this patent is extended or adjusted under 35 U.S.C. 154(b) by 0 days.

(21) Appl. No.: 16/441,138

(22) Filed: Jun. 14, 2019

(30) Foreign Application Priority Data

May 13, 2019 (CA) ...................................... 3043077

(51) Int. Cl.
*B60N 2/60* (2006.01)
*B64D 11/06* (2006.01)

(52) U.S. Cl.
CPC ......... *B60N 2/6009* (2013.01); *B60N 2/6063* (2013.01); *B64D 11/0646* (2014.12); *B64D 11/0647* (2014.12)

(58) Field of Classification Search
CPC ...... B60N 2/60; B60N 2/6009; B60N 2/6063; B64D 11/0647; B64D 11/0646; A47G 11/004; A47C 7/386; A47C 31/11
USPC ............... 297/217.1, 220, 227, 219.1, 188.2, 297/188.06, 188.18, 188.07
See application file for complete search history.

(56) References Cited

U.S. PATENT DOCUMENTS

| | | | | |
|---|---|---|---|---|
| 5,050,713 | A * | 9/1991 | Lee ...................... | A45C 7/0086 150/110 |
| 7,077,479 | B1 * | 7/2006 | Phillips .................... | B60N 2/75 297/463.2 |
| 8,220,873 | B2 * | 7/2012 | Kemp .................... | A47C 7/021 297/217.1 |
| 9,051,087 | B1 * | 6/2015 | Daniels .................. | B65D 33/00 |
| 9,643,727 | B2 | 5/2017 | Dall'Era et al. | |
| 2007/0257533 | A1 * | 11/2007 | Resendez ............. | B60N 2/6063 297/228.11 |
| 2013/0320720 | A1 * | 12/2013 | Steinmetz ............... | G09F 23/00 297/219.1 |
| 2015/0329274 | A1 * | 11/2015 | Bennett .................. | B65D 85/00 206/223 |
| 2018/0027987 | A1 * | 2/2018 | Calhoun ................ | A47C 7/622 |

* cited by examiner

*Primary Examiner* — Milton Nelson, Jr.
(74) *Attorney, Agent, or Firm* — Davis & Bujold PLLC; Michael J. Bujold

(57) ABSTRACT

A hygienic kit for airplanes has a tray cover, a pair of arm rest covers and a headrest cover. The tray cover has a table covering with a first end that is removably attachable to an airplane tray table and a second end that is attached to a pocket. Pocket has a front face, a back face, peripheral sides and an open top. Second end of table covering is attached to the front face of the pocket. The tray cover is folded into a compact envelope and unfoldable for use. Each arm rest cover has an arm rest panel and side panels. The side panels allow each arm rest cover to be removably attachable to an airplane arm rest. The headrest cover has a front panel and a rear panel. The front panel and the rear panel are connected to form a cap sized to be removably positioned over an airplane headrest.

15 Claims, 6 Drawing Sheets

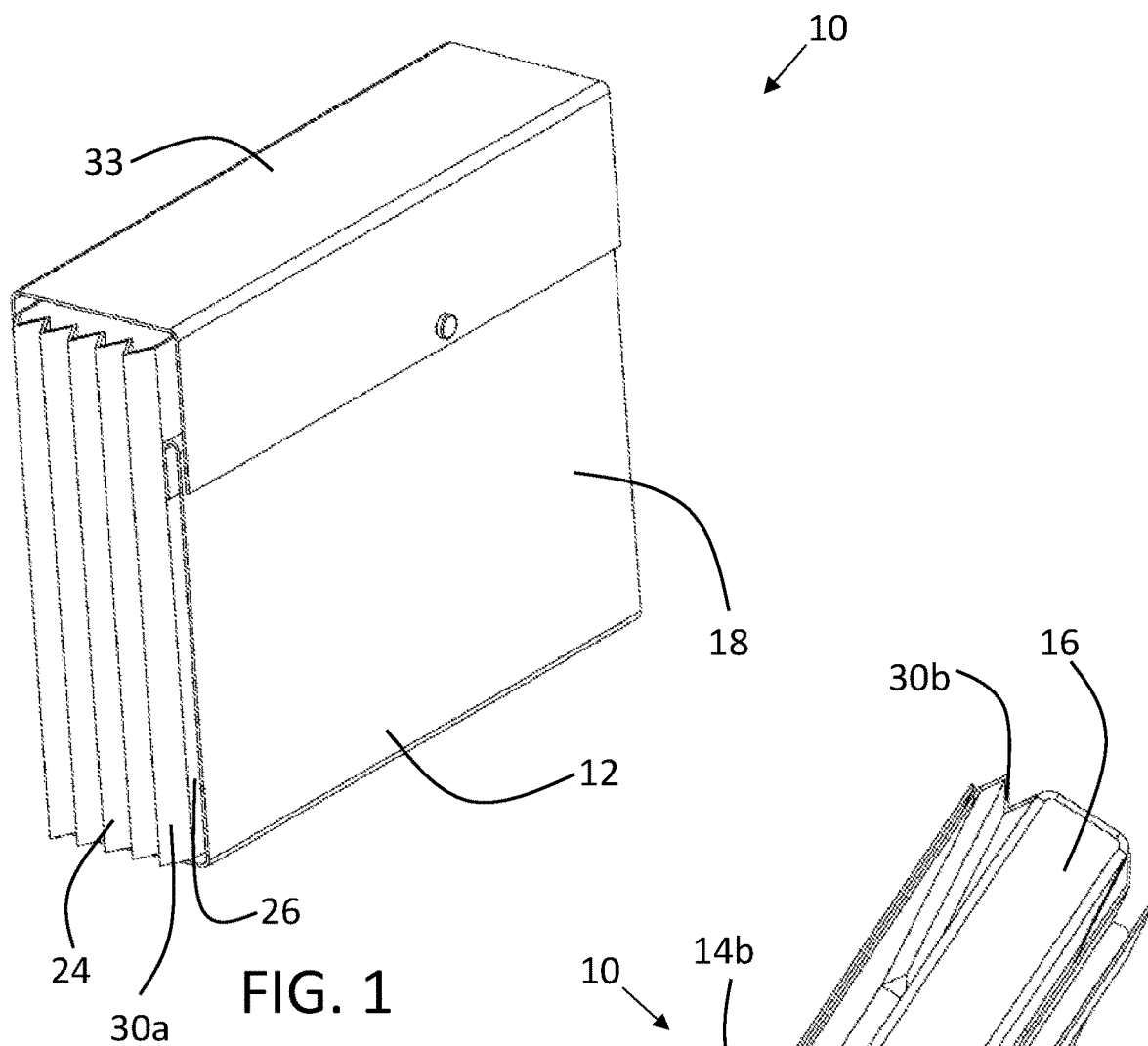
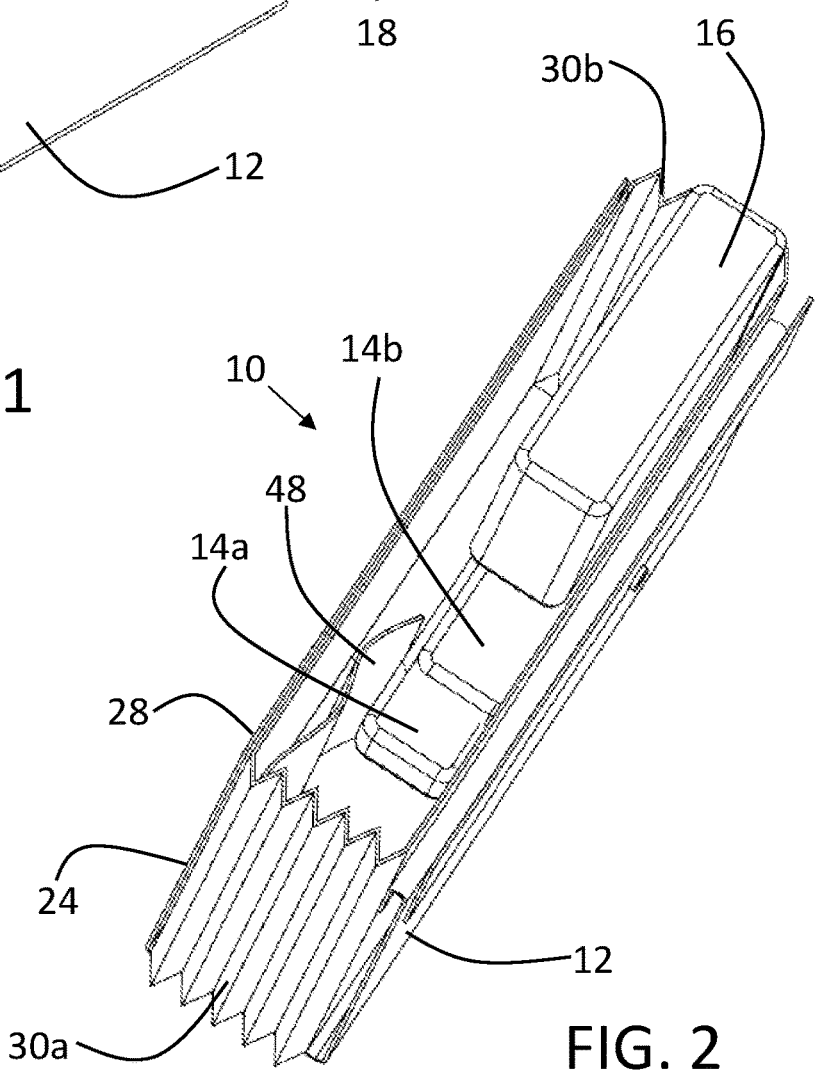

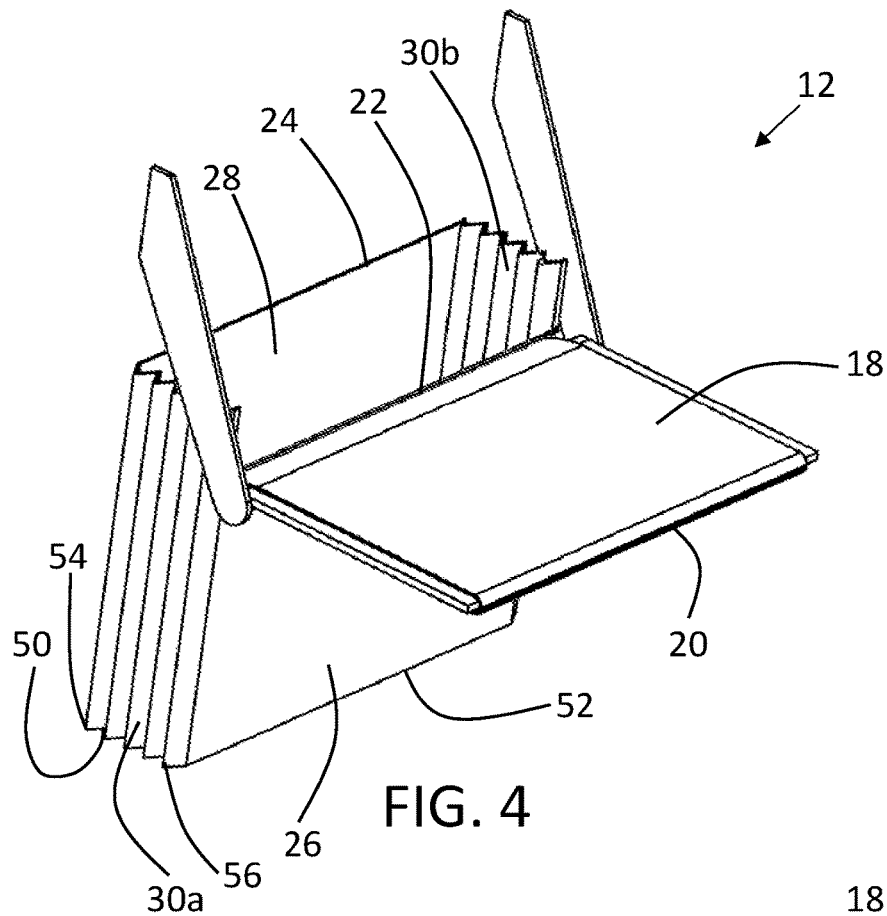
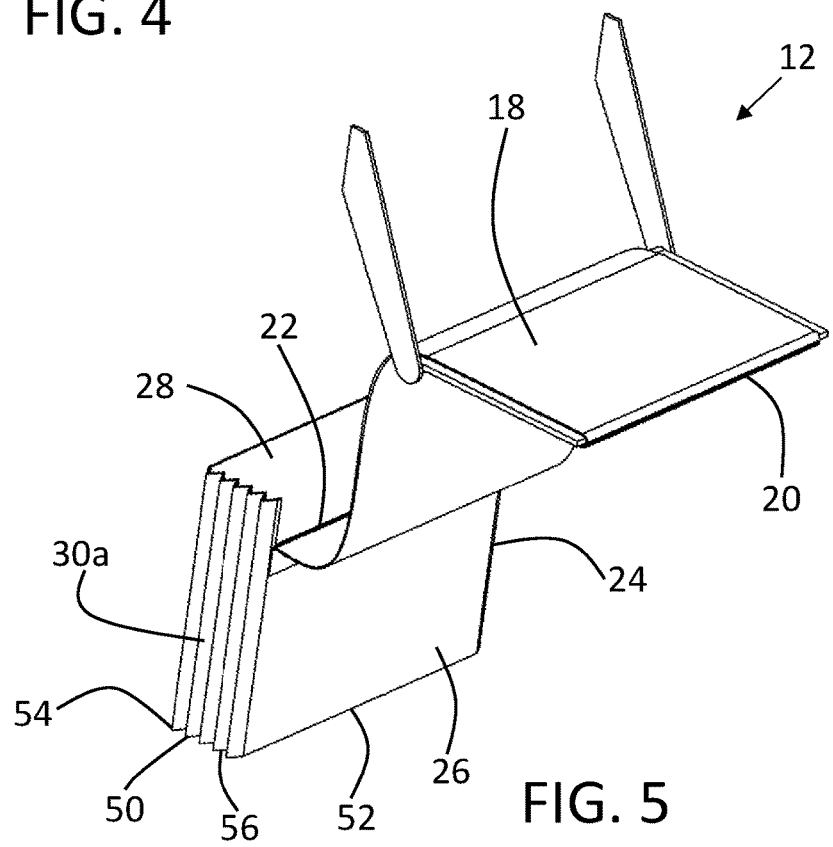

HYGIENIC KIT FOR AIRPLANES

FIELD OF THE DISCLOSURE

The present application relates generally to a hygienic kit for airplanes, more specifically a compact and disposable hygienic kit for airplanes.

BACKGROUND

This section provides background information to facilitate a better understanding of the various aspects of the invention. It should be understood that the statements in this section of this document are to be read in this light, and not as admissions of prior art.

With the large number of people traveling by airplane, it is well known that airplane surfaces are not particularly clean. Passengers can spread germs, lice and other bugs to those sitting in the seats after them. With no way of knowing who has been sitting in a seat and what potential issues they may have, it could be beneficial to have a way to protect passengers from the germs and bugs of previous passengers.

BRIEF SUMMARY

There is provided a hygienic kit for airplanes that includes a tray cover, a pair of arm rest covers and a headrest cover. The tray cover is made up of a table cover and a pocket. The table cover has a first end that is removably attachable to an airplane tray table and a second end. The pocket has a front face, a back face, peripheral sides and an open top. The second end of the table cover is attached to the front face of the pocket. This allows items to be pushed away from the user into the pocket from the table cover. The tray cover is folded into a compact envelope and is unfoldable for use. The arm rest covers each have an arm rest panel and side panels. The side panels allow each arm rest cover to be removably attachable to an airplane arm rest. The headrest cover has a front panel and a rear panel. The front panel and the rear panel are connected to form a cap sized to be removably positioned over an airplane headrest.

In one embodiment, the back face of the pocket extends upwards such that the height of the back face is at least as high at the height of the front face.

In another embodiment, the peripheral sides of the pocket are accordioned to allow the pocket to expand in size.

In one embodiment, the pocket also has a bottom face. The bottom face is attached to the bottom edge of the front face, back face and peripheral sides. The bottom face of the pocket may be accordioned to allow the pocket to expand in size.

In one embodiment, the pocket is sized to fit within a seatback pocket of an airplane. The seatback pocket can provide greater support for the pocket, particularly when items are placed in it.

In one embodiment, the first end of the table covering has a stretchable material that is stretchable over an edge of the airplane tray table for removable attachment of the table covering.

In another embodiment, the side panels of the pair of arm rest covers are a stretchable material that is stretchable over the airplane arm rest for removable attachment of the arm rest covers.

In another embodiment, a bottom edge of the cap has a stretchable material that is stretchable over the airplane headrest for removable attachment of the headrest cover.

In one embodiment, the pair of arm rest covers and the headrest cover are stored in the compact envelope.

In one embodiment, the hygienic kit also includes a sanitizing wipe. The sanitizing wipe may have an alcohol based sanitizing solution or any other solution known to a person skilled in the art. The sanitizing wipe may be stored in the compact envelope with the pair of arm rest covers and the headrest cover.

There is also provided a hygienic kit for airplanes that includes a table covering, an envelope, a pair of arm rest covers and a headrest cover. The table covering has a table top, a front side, a rear side and peripheral sides that allow the table covering to be removably attachable to an airplane tray table. The envelope has a first pocket and a second pocket. Each of the first pocket and the second pocket having a front face, a back face, peripheral sides and an open top. A top edge of the back face of the first pocket is attached to a top edge of the front face of the second pocket. The arm rest covers each have an arm rest panel and side panels. The side panels allow each arm rest cover to be removably attachable to an airplane arm rest. The headrest cover has a front panel and a rear panel. The front panel and the rear panel are connected to form a cap sized to be removably positioned over an airplane headrest.

In another embodiment, the peripheral sides of the first pocket are accordioned to allow the pocket to expand in size.

In one embodiment, the first pocket also has a bottom face. The bottom face is attached to the bottom edge of the front face, back face and peripheral sides. The bottom face of the first pocket may be accordioned to allow the pocket to expand in size.

In one embodiment, the second pocket is sized to fit within a seatback pocket of an airplane. The seatback pocket can provide greater support for the pocket, particularly when items are placed in it.

In one embodiment, the front side, the rear side and the peripheral sides of the table covering have a stretchable material that is stretchable over the edges of the airplane tray table for removable attachment of the table covering.

In another embodiment, the side panels of the pair of arm rest covers are a stretchable material that is stretchable over the airplane arm rest for removable attachment of the arm rest covers.

In another embodiment, a bottom edge of the cap has a stretchable material that is stretchable over the airplane headrest for removable attachment of the headrest cover.

In one embodiment, the pair of arm rest covers, the headrest cover and table covering are stored in the envelope.

In one embodiment, the hygienic kit also includes a sanitizing wipe. The sanitizing wipe may have an alcohol based sanitizing solution or any other solution known to a person skilled in the art. The sanitizing wipe may be stored in the compact envelope with the pair of arm rest covers, the headrest cover and table covering.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

FIG. 1 is a perspective view of a hygienic kit for airplanes in a folded envelope form.

FIG. 2 is a top perspective view of the hygienic kit for airplanes in the folded envelope form with an open top.

FIG. 4 is a perspective view of a tray cover.

FIG. 5 is a perspective view of a variation of tray cover.

DETAILED DESCRIPTION OF THE PREFERRED EMBODIMENTS

Figure 3:
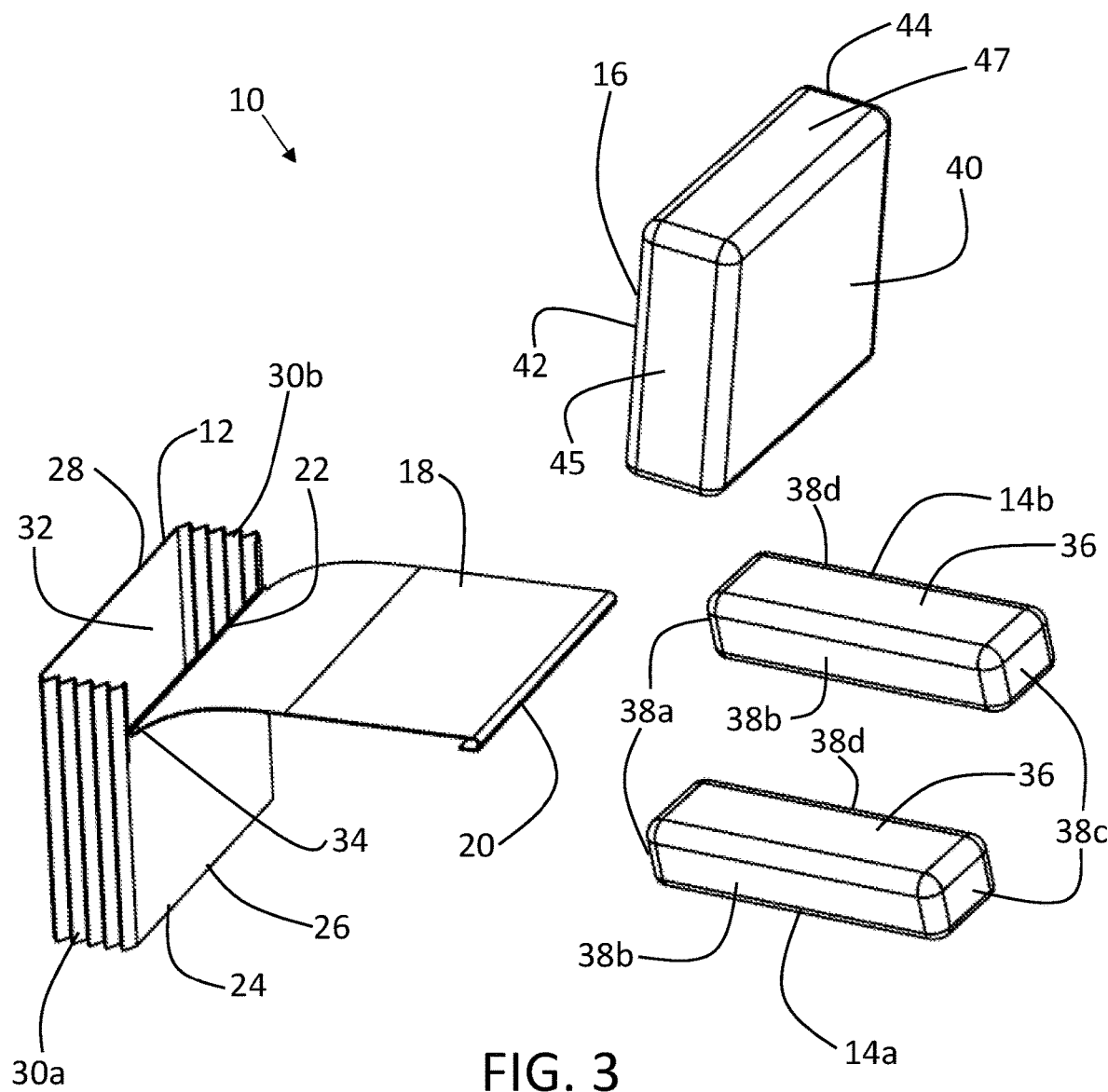
FIG. 3 is a perspective view of the hygienic kit for airplanes unfolded and with the covers removed.
Figure 6:
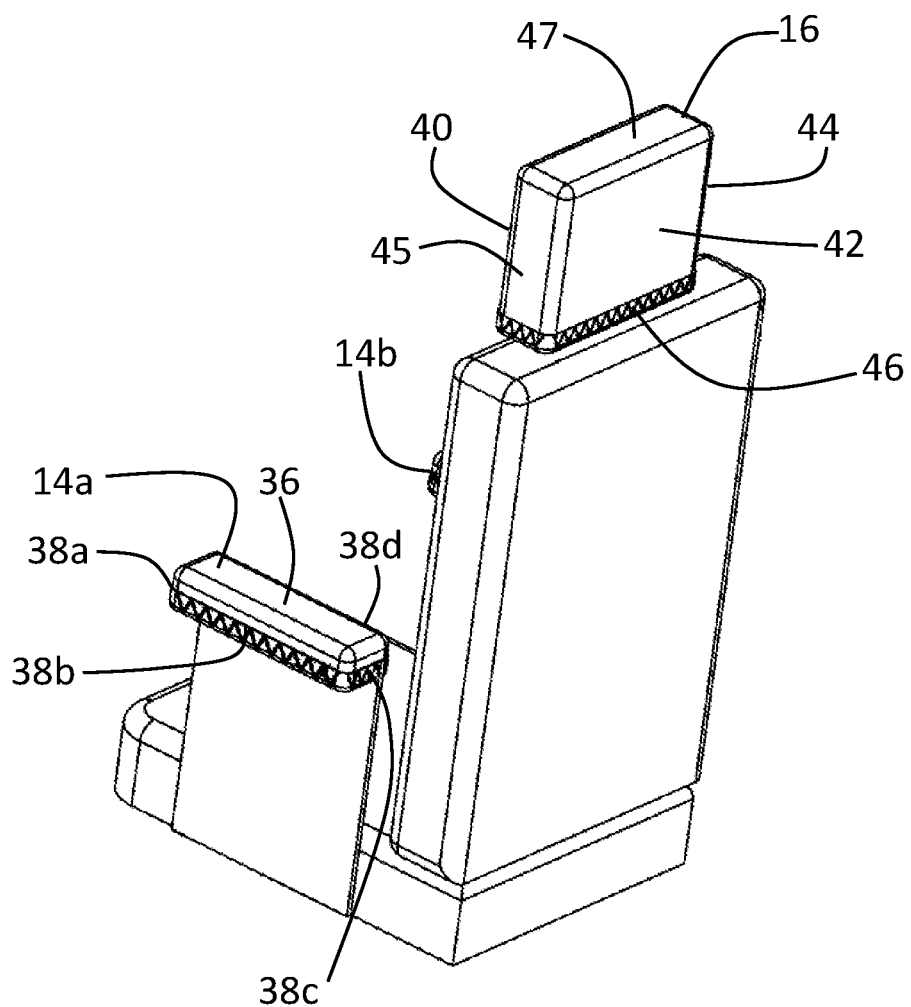
FIG. 6 is a perspective view of the arm and headrest covers on an airplane chair.

A hygienic kit for airplanes, generally identified by reference numeral 10, will be described with reference to FIG. 1 through FIG. 6. A variation of a hygienic kit for airplanes, generally identified by reference numeral 100, will be described with reference to FIG. 7 through FIG. 9.

Referring to FIG. 3, a hygienic kit for airplanes 10 has a tray cover 12, a pair of arm rest covers 14a and 14b and a headrest cover 16. Tray cover 12, arm rest covers 14a and 14b and headrest cover 16 are preferably made of a light weight and flexible material that allows for folding and compression so that hygienic kit for airplanes 10 can be relatively thin when folded and not in use. It may also be beneficial for hygienic kit 10 to be made of starch based product that is biodegradable. Material may be infused with a cleanser to help eliminate germs. Tray cover 12 has a table covering 18 with a first end 20 and a second end 22. First end 20 of table covering 18 is removably attachable to an airplane tray table. This allows table covering 18 to be held in place and can prevent sliding of table covering 18 during use. In the embodiment shown, first end 20 of table covering 18 is made of a stretchable material that allows first end 20 to be stretched over the edge of an airplane tray table closes to the user. Stretchable material is resilient to allow first end 20 to be secured to the airplane tray table during use and easily removed by restretching the material to remove first end 20 of table covering 18 from airplane tray table when the user is done with it. Tray cover 12 also has a pocket 24 that has a front face 26, a back face 28, peripheral sides 30a and 30b, and an open top 32. In the embodiment shown in FIG. 1, a top closure 33 is provided to prevent arm rest covers 14a and 14b and headrest cover 16 from falling out during transport. Top closure 33 is optional and may be folded back, removed, extended upwards or left to cover open top 32. Referring to FIG. 3, second end 22 of table cover 18 is attached to a top edge 34 of front face 26 of pocket 24. In the embodiment shown in FIG. 1, tray cover 12 is folded into a compact envelope for storage and transport purposes. Referring to FIG. 3, tray cover 12 is unfolded for use. In each of the embodiments shown, pocket 24 is shown in an extended form. It will be understood by a person skilled in the art that pocket 24 may be compressed such that front face 26 and back face 28 are provided in contact or close proximity to each other.

Referring to FIG. 2, pocket 24 may be used to store arm rest covers 14a and 14b and headrest cover 16 when tray cover 12 is folded into the compact envelope. Pocket 24 may also be used as a garbage receptacle when tray cover 12 is unfolded for use. In one embodiment, pocket 24 is made of a non-permeable material such that it is leak proof. Referring to FIG. 4 and FIG. 5, to facilitate use of pocket 24 as a garbage receptacle, back face 28 extends upwards such that the height of back face 28 is at least as high as the height of front face 26. This prevents garbage from falling out the back of pocket 24 as it is pushed into pocket 24 from table covering 18. In the embodiment shown, peripheral sides 30a and 30b are accordioned to allow pocket 24 to expand in size as it is filled. Pocket 24 may also have a bottom face 50. Bottom face 50 is attached to bottom edge 52 of front face 26, bottom edge 54 of back face 28 and bottom edge 56 of peripheral sides 30a and 30b. Bottom face 50 of pocket 24 may be accordioned to allow pocket 24 to expand in size. It will be understood by a person skilled in the art that bottom edge 52 of front face 26 and bottom edge 54 of back face 28 may be attached such that pocket 24 forms a "V" shape and peripheral sides 30a and 30b have a more triangular appearance. As can be seen, the length of table cover 18 may vary depending upon the distance between first end 20 and second end 22. The length may be dependent on the distance between the seat back pocket and the edge of the tray table to be covered closest to the user. Pocket 24 may be reinforced with wires or other suitable materials to make pocket 24 more sturdy. Referring to FIG. 2, a sanitizing wipe 48 may also be stored within tray cover 12 when it is folded into the compact envelope. It will be understood by a person skilled in the art that sanitizing wipe may have an alcohol based sanitizing solution or any other acceptable sanitizing solution known to a person skilled in the art. While not shown, a plastic disposable bag may also be included within envelope 103 for use in disposing of wet or smelly items such as diapers when a baby is being changed.

Referring to FIG. 3, arm rest covers 14a and 14b each have an arm rest panel 36 and side panels 38a, 38b, 38c and 38d. Side panels 38a, 38b, 38c and 38d allow each arm rest cover 14a and 14b to be removably attachable to an airplane arm rest. In the embodiment shown in FIG. 6, side panels 38a, 38b, 38c and 38d are made of a stretchable material that allows side panels 38a, 38b, 38c and 38d to be stretched over the airplane arm rest. Stretchable material is resilient to allow arm rest covers 14a and 14b to be secured to the airplane arm rest during use and easily removed by restretching the material to remove arm rest covers 14a and 14b from airplane arm rests when the user is done with them.

Referring to FIG. 3, headrest cover 16 has a front panel 40 and a rear panel 42. Front panel 40 and rear panel 42 are connected to form a cap 44 sized to be removably positioned over an airplane headrest. It will be understood that the edges of front panel 40 and rear panel 42 may be connected directly to each other to form cap 44 or side panels 45 and a top panel 47 may be used to connect front panel 40 and rear panel 42 to each other. The way in which front panel 40 and rear panel 42 are connected is dependent upon the size of airplane headrest that headrest cover 16 is made to cover. In the embodiment shown in FIG. 6, a bottom edge 46 of cap 44 is made of a stretchable material that allows cap 44 to be stretched over the airplane headrest. Stretchable material is resilient to allow headrest cover 16 to be secured to the airplane headrest during use and easily removed by restretching the material to remove headrest cover 16 from airplane headrests when the user is done with it. Headrest cover 16 may cover the entire airplane headrest, a portion of airplane headrest or the pillow portion of airplane headrest.

A variation of a hygienic kit for airplanes, generally identified by reference numeral 100, will now be described with reference to FIG. 7 through FIG. 9.

Figure 8:
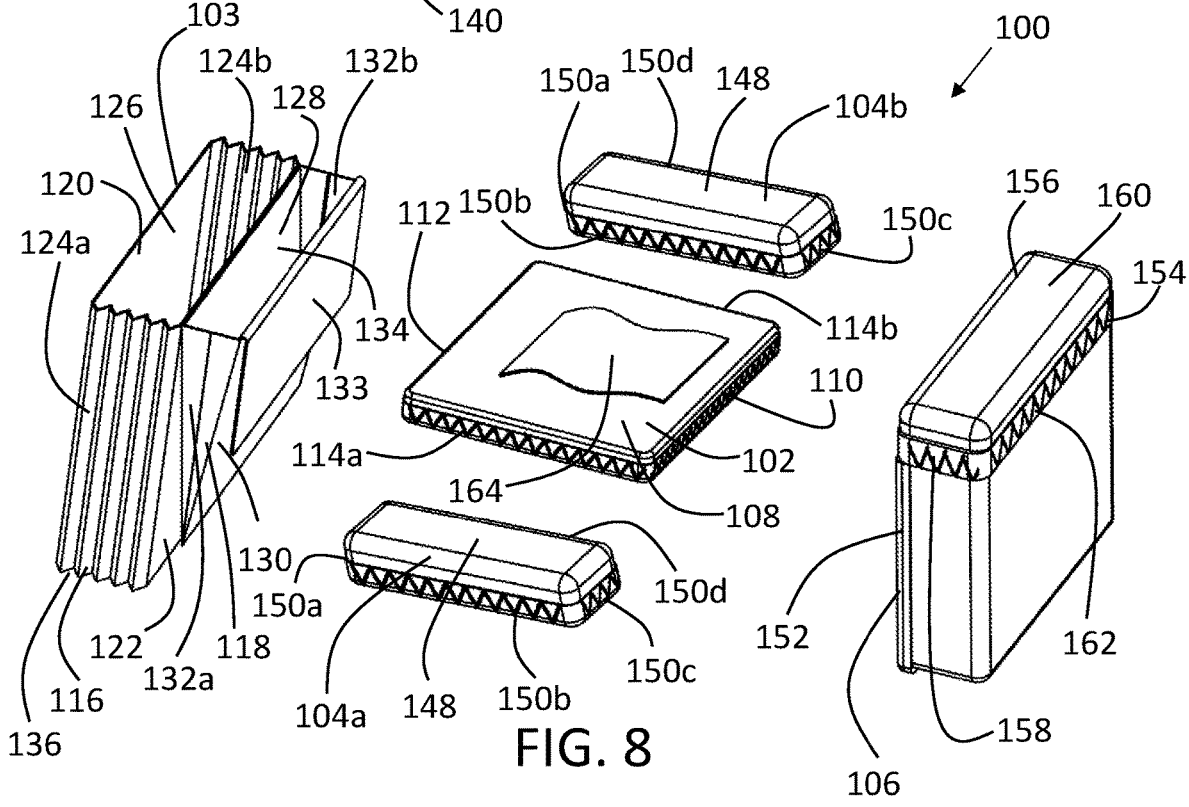
FIG. 8 is a perspective view of a variation of the hygienic kit for airplanes unfolded and with the covers removed.

Referring to FIG. 8, a hygienic kit for airplanes 100 has a table cover 102, an envelope 103, a pair of arm rest covers 104a and 104b and a headrest cover 106. Table cover 102, envelope 103, arm rest covers 104a and 104b and headrest cover 106 are preferably made of a light weight and flexible material that allows for folding and compression so that hygienic kit for airplanes 100 can be relatively thin when folded and not in use. Material may be infused with a cleanser to help eliminate germs. Table covering 102 has a table top 108, a front side 110, a rear side 112 and peripheral sides 114a and 114b. Table covering 102 is removably attachable to an airplane tray table. Front side 110, rear side 112 and peripheral sides 114a and 114b may be made of stretchable material that allows them to be stretched over the edge of the airplane tray table. Stretchable material is resilient to allow table cover 102 to be secured to the airplane tray table during use and easily removed by restretching the material to remove table cover 102 when the user is done with it.

Figure 7:
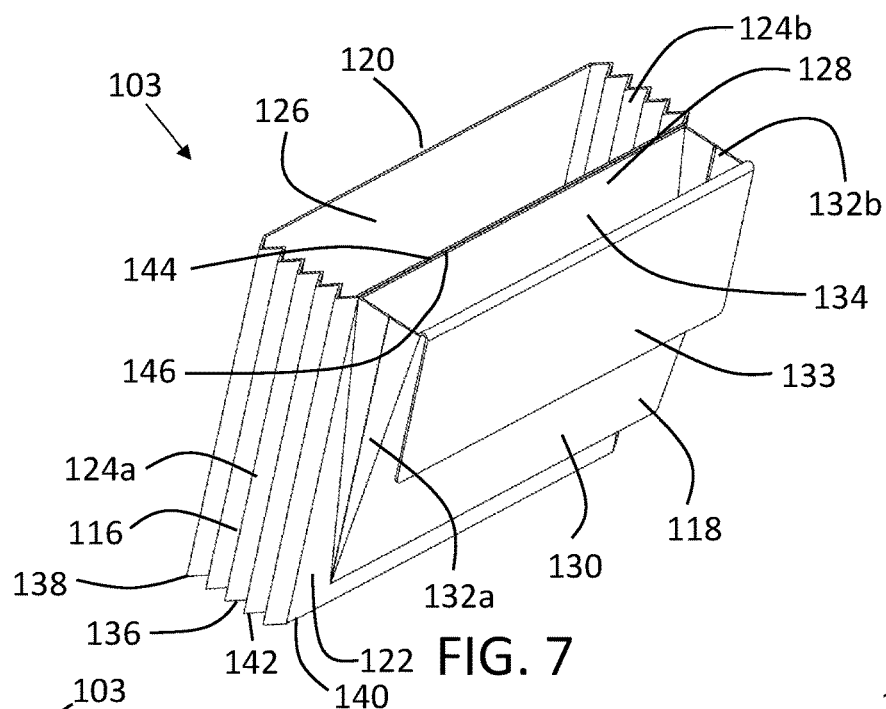
FIG. 7 is a perspective view of a variation of the folded envelope form.

Referring to FIG. 7, envelope 103 has a first pocket 116 and a second pocket 118. First pocket 116 has a front face 120, a back face 122, peripheral sides 124a and 124b, and an open top 126. Second pocket 118 has a front face 128, a back face 130, peripheral sides 132a and 132b, and an open top 134. In the embodiment shown, a top closure 133 is provided to prevent table covering 102, arm rest covers 104a and 104b and headrest cover 106 from falling out during transport. Top closure 133 is optional and may be folded back, removed, extended upwards or left to cover open top 126 and open top 134. In the embodiment shown, envelope 103 is shown in an extended form. It will be understood by a person skilled in the art that first pocket 116 and second pocket 118 may be compressed such that front face 120, back face 122, front face 128 and back face 130 are provided in contact or close proximity to each other. First pocket 116 and second pocket 118 may be made of a non-permeable material such that first pocket 116 and second pocket 118 is leak proof. First pocket 116 and second pocket 118 may be used to store table covering 102, arm rest covers 104a and 104b and headrest cover 106. First pocket 116 and second pocket 118 may also be used as a garbage receptacle. First pocket 116 and second pocket 118 may also be used to store items. In one embodiment, first picket 116 is used as a garbage receptacle while second pocket 118 is used to store items such as head phones, cellular phones and books. In the embodiment shown, peripheral sides 124a and 124b are accordioned to allow first pocket 116 to expand in size as it is filled. First pocket 116 may also have a bottom face 136. Bottom face 136 is attached to bottom edge 138 of front face 120, bottom edge 140 of back face 122 and bottom edge 142 of peripheral sides 124a and 124b. Bottom face 136 of first pocket 116 may be accordioned to allow first pocket 116 to expand in size. It will be understood by a person skilled in the art that bottom edge 138 of front face 120 and bottom edge 140 of back face 122 may be attached such that first pocket 116 forms a "V" shape and peripheral sides 124a and 124b have a more triangular appearance. In the embodiment shown, a top edge 144 of back face 122 of first pocket 116 and top edge 146 of front face 128 of second pocket 118 are attached. First pocket 116 and second pocket 118 may be reinforced with wires or other suitable materials to make first pocket 116 and second pocket 118 more sturdy.

Referring to FIG. 8, arm rest covers 104a and 104b each have an arm rest panel 148 and side panels 150a, 150b, 150c and 150d. Side panels 150a, 150b, 150c and 150d allow each arm rest cover 104a and 104b to be removably attachable to an airplane arm rest. Side panels 150a, 150b, 150c and 150d are made of a stretchable material that allows side panels 150a, 150b, 150c and 150d to be stretched over the airplane arm rest. Stretchable material is resilient to allow arm rest covers 104a and 104b to be secured to the airplane arm rest during use and easily removed by restretching the material to remove arm rest covers 104a and 104b from airplane arm rests when the user is done with them.

Figure 9:
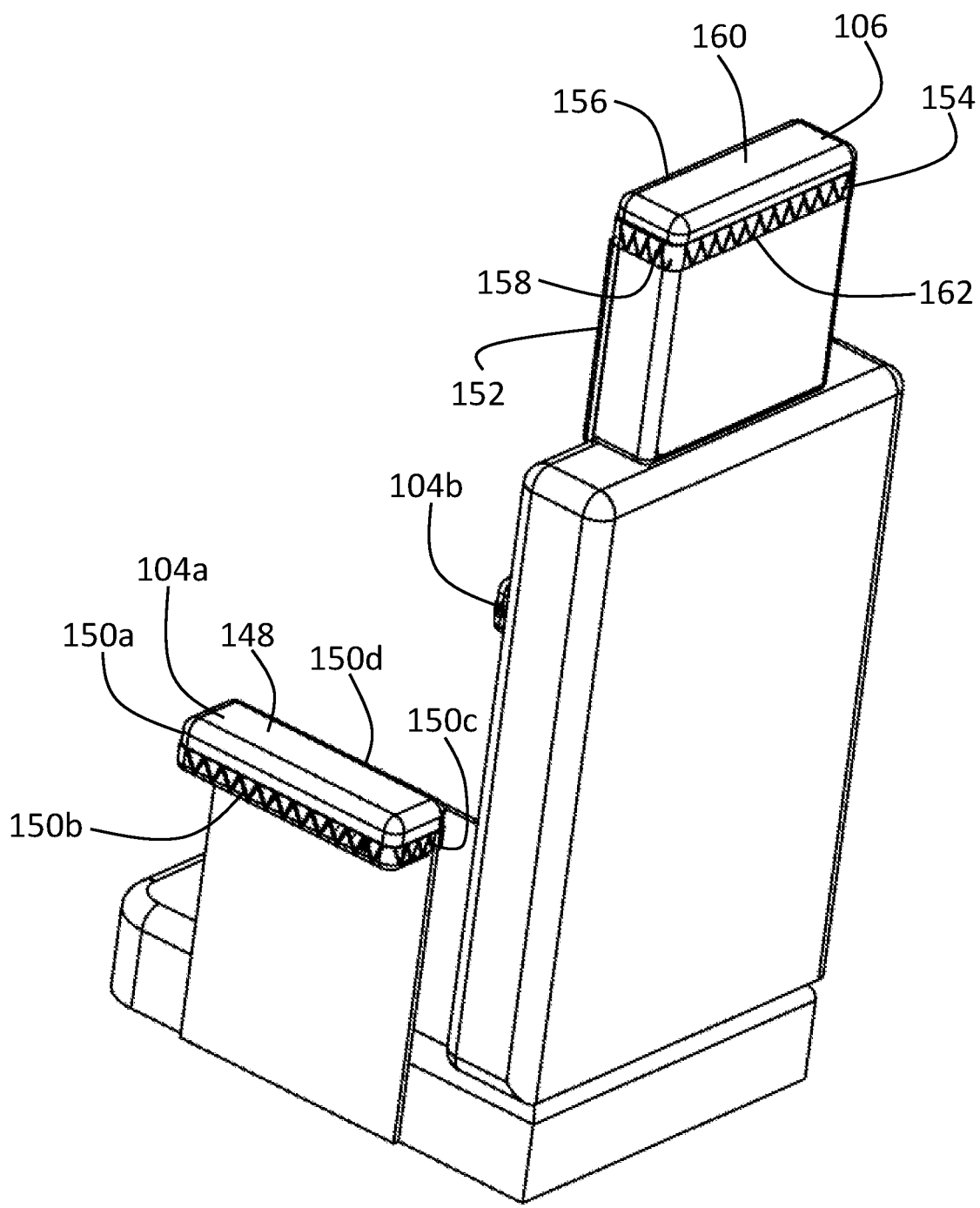
FIG. 9 is a perspective view of the arm covers and a variation of the headrest cover on an airplane chair.

Referring to FIG. 9, headrest cover 106 has a front panel 152 and a rear panel 154. Front panel 152 and rear panel 154 are connected to form a cap 156 sized to be removably positioned over an airplane headrest. It will be understood that the edges of front panel 152 and rear panel 154 may be connected directly to each other to form cap 156 or side panels 158 and a top panel 160 may be used to connect front panel 152 and rear panel 154 to each other. The way in which front panel 152 and rear panel 154 are connected is dependent upon the size of airplane headrest that headrest cover 106 is made to cover. In the embodiment shown, a bottom edge 162 of cap 156 is made of a stretchable material that allows cap 156 to be stretched over the airplane headrest. Stretchable material is resilient to allow headrest cover 106 to be secured to the airplane headrest during use and easily removed by restretching the material to remove headrest cover 106 from airplane headrests when the user is done with it. In the embodiment shown, rear panel 154 and side panels 158 are shorter in length than front panel 152 of headrest 106. This allows the front of airplane headrest to be covered while limiting the amount of material needed for headrest cover 106. Headrest cover 106 may cover the entire airplane headrest, a portion of airplane headrest or the pillow portion of airplane headrest.

Referring to FIG. 8, a sanitizing wipe 164 may also be stored within envelope 103. It will be understood by a person skilled in the art that sanitizing wipe may have an alcohol based sanitizing solution or any other acceptable sanitizing solution known to a person skilled in the art. While not shown, a plastic disposable bag may also be included within envelope 103 for use in disposing of wet or smelly items such as diapers when a baby is being changed.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A hygienic kit for airplanes comprising:
   a tray cover comprising:
      a sheet table covering having a first end and a second end, the first end of the table covering being removably attachable to a passenger side of an airplane tray table;
      a pocket having a front face, a back face, peripheral sides, and an open top, the second end of the table covering being attached to the front face of the pocket; when the table covering is attached to the airplane tray table the pocket rests behind the airplane tray table adjacent an airplane seat, the open top of the pocket being accessible from a rear of the airplane tray table when the airplane tray table is in use; and the tray cover being folded into a compact envelope and unfoldable for use;

a pair of arm rest covers, each arm rest cover having an arm rest panel and side panels, the side panels allowing each arm rest cover to be removably attachable to an airplane arm rest;

a headrest cover having a front panel and a rear panel, the front panel and the rear panel being connected to form a cap sized to be removably positioned over an airplane headrest.

2. The hygienic kit of claim 1 wherein the back face extends upwards such that the height of the back face is at least as high as the height of the front face.

3. The hygienic kit of claim 1 wherein the peripheral sides of the pocket are accordioned to allow the pocket to expand in size.

4. The hygienic kit of claim 1 wherein the pocket further comprises a bottom face.

5. The hygienic kit of claim 4 wherein the bottom face of the pocket is accordioned to allow the pocket to expand in size.

6. The hygienic kit of claim 1 wherein the pocket is sized to fit within a seatback pocket of an airplane.

7. The hygienic kit of claim 1 wherein the first end of the table covering has a stretchable material that is stretchable over an edge of the airplane tray table for removable attachment of the table covering.

8. The hygienic kit of claim 1 wherein the side panels of the pair of arm rest covers are a stretchable material that is stretchable over the airplane arm rest for removable attachment of the arm rest covers.

9. The hygienic kit of claim 1 wherein a bottom edge of the cap has a stretchable material that is stretchable over the airplane headrest for removable attachment of the headrest cover.

10. The hygienic kit of claim 1 wherein the pair of arm rest covers and the headrest cover are stored in the compact envelope.

11. The hygienic kit of claim 1 further comprising a sanitizing wipe.

12. The hygienic kit of claim 11 wherein the sanitizing wipe has an alcohol based sanitizing solution.

13. The hygienic kit of claim 11 wherein the sanitizing wipe is stored in the compact envelope.

14. The hygienic kit of claim 1 further comprising a second pocket, the second pocket having a front face, a back face, peripheral sides, and an open top, a top edge of the back face of the first pocket being attached to a top edge of the front face of the second pocket.

15. The hygienic kit of claim 14 wherein the second pocket is sized to fit within a seatback pocket of an airplane.

* * * * *